UNITED STATES PATENT OFFICE.

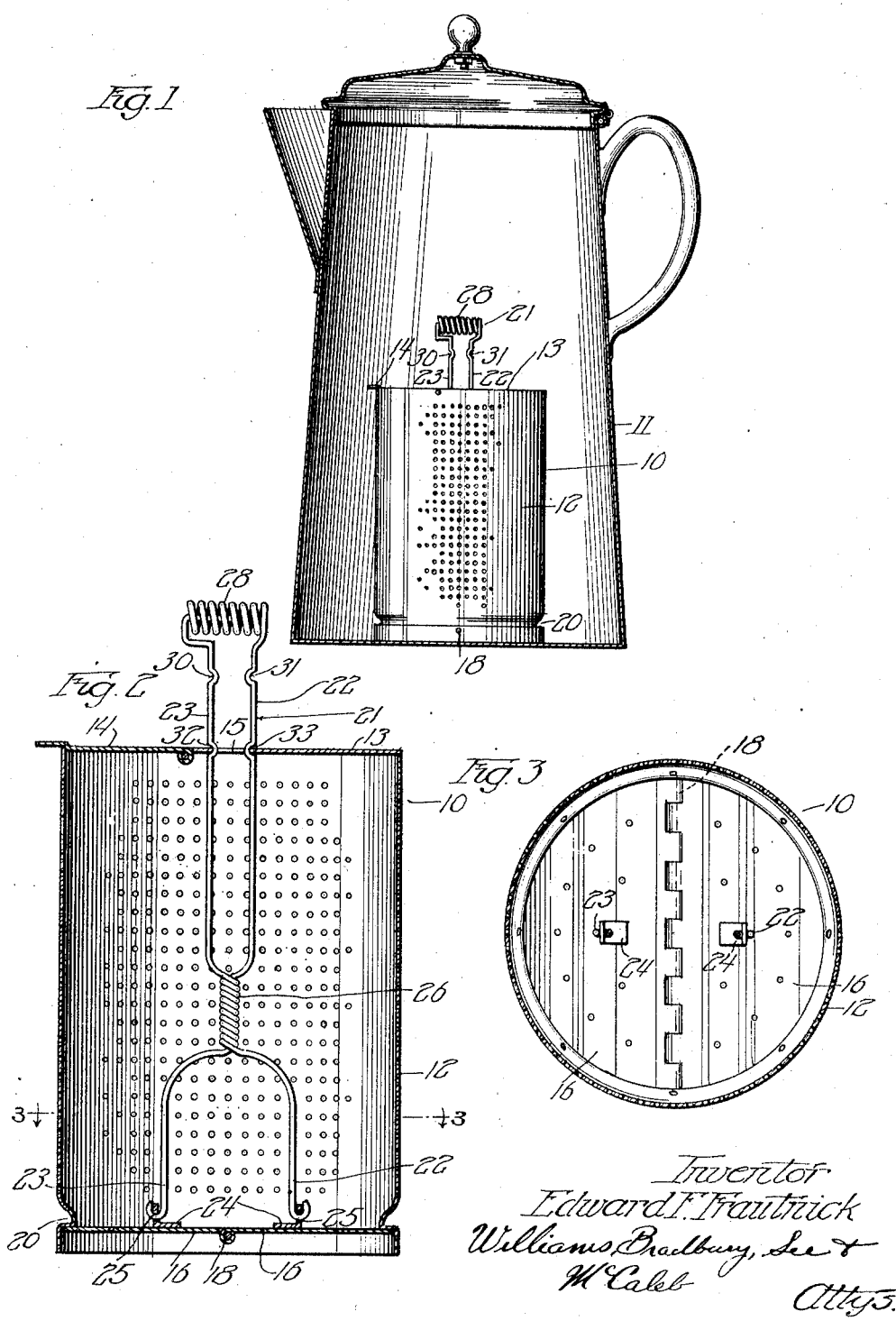

EDWARD F. FRAUTNICK, OF ELGIN, ILLINOIS.

KITCHEN UTENSIL.

1,388,636.	Specification of Letters Patent.	Patented Aug. 23, 1921.

Application filed April 16, 1921. Serial No. 461,983.

*To all whom it may concern:*

Be it known that I, EDWARD F. FRAUTNICK, a citizen of the United States, and resident of Elgin, in the county of King and State of Illinois, have invented a certain new and useful Improvement in Kitchen Utensils, of which the following is a full, clear, concise, and exact description, reference being had to the accompanying drawings, forming a part of this specification.

My invention relates to kitchen utensils and more particularly to kitchen utensils employed in the making of beverages, such as tea and coffee.

It is desirable that a beverage of the class described be clear and free of all particles of solid substance from which it is made. To accomplish this, the substance such as ground coffee or tea leaves may be confined in an auxiliary receptacle adapted to be immersed in the water in which the substance is to be boiled or steeped.

My invention contemplates a closed receptacle in which ground coffee or the like may be confined and which may be placed within a larger receptacle, such as a coffee pot.

The object of my invention is to provide a device of the class described having a perforated wall and a door through which the receptacle may be charged or emptied and means for securing the door in a closed position.

These and other objects of my invention will be more clearly pointed out as the following description progresses, reference being had to the accompanying drawing, wherein—

Figure 1 is a side elevation of a kitchen utensil embodying the novel features of my invention, the utensil being illustrated in connection with the coffee pot which is shown in section.

Fig. 2 is a vertical section taken through my improved kitchen utensil, and

Fig. 3 is a section taken on line 3—3 of Fig. 2.

Similar characters of reference indicate similar parts throughout the several views.

In Fig. 1 the reference character 10 designates my improved kitchen utensil shown in connection with a coffee pot 11, the coffee pot 11 being of a common type. The kitchen utensil 10 is adapted to be placed in the coffee pot 11 and to contain the ground coffee from which the beverage is to be made.

In the improved form of my invention, the kitchen utensil 10 is cylindrical in form, its cylindrical wall 12 being made of perforated sheet metal, a wall 13 and a door 14 serve to close the upper end of the receptacle, the wall 13 being apertured as at 15 for a purpose which will presently appear. The bottom end of the receptacle is normally closed by a pair of doors 16—16. The doors 16—16 are semi-circular in form and are pivotally mounted in the receptacle by means of a pin 18 which has its ends rigidly secured in the cylindrical wall 12. The doors 16—16 are adapted to contact the lower wall of an annular groove 20 formed in the cylindrical wall 12, when they are in the closed position. It is apparent that this structure will effectively seal the bottom end of the container so as to prevent egress of the ground coffee during the boiling process or when the receptacle is being placed in or withdrawn from the coffee pot.

To close or open the doors 16—16 I provide a handle 21, which is also adapted to lock the doors in either of the above described positions. The handle 21 comprises a plurality of spring members 22 and 23 preferably made of spring wire blanks. As shown in Fig. 2, the lower end of each of the spring members 22 and 23 is fastened to one of the doors 16—16, an angle plate 24 being rigidly secured to each door 16 for this purpose. Each angle plate 24 is apertured as at 25. The end of the associated spring member passes through the aperture 25 and is bent back upon itself to prevent accidental disengagement of the spring member from within the associated angle plate 24. The spring members 22 and 23 are secured to each other at a point intermediate their respective ends. This is done by twisting the two wires of which they are made tightly together as at 26. The upper ends of the spring members project through the aperture 15 provided in the wall 13, and the upper end of the spring member 22 terminates in an integral helical compression spring 28 which is disposed at right angles to the axis of the cylindrical receptacle. The upper end of the spring member 23 is arranged to contact the free end of the spring 28. It is readily understood that the operator may move the upper portions of the spring members 22 and 23 toward each other by compressing the spring 28.

Referring to Fig. 2, it will be noted that the upper portion of the handle 21 is provided with two pairs of notches, 30 and 31, and 32 and 33, respectively. Notches 30 and 32 are formed in the spring member 23, and the notches 31 and 33 are formed in the spring member 22. The notches 32 and 33 are arranged to engage that portion of the wall 13 which surrounds the aperture 15, when the doors 16—16 are in the closed position, and thereby secures them in the closed position. It is, of course, understood, that the spring members 22 and 23 are urged away from each other by the compression spring 28. To open the doors 16—16 the operator compresses the spring 28 and pushes the handle 21 downwardly until the notches 30 and 31 register with the wall 13. The notches 30 and 31 will then serve to lock the doors 16—16 in the open position.

In the operation of the device, the ground coffee may be placed in the receptacle by way of the door 14 and the device placed in the coffee pot. After the beverage has been prepared, the operator may open the doors 16—16 by means of the handle 21 and thoroughly cleanse the receptacle.

While I have thus described the details of one form of my invention, it is to be understood that I am not limited to these details except by the scope of the appended claims.

What I claim is:

1. A device of the class described, comprising a receptacle having a perforated side wall and a top wall, and means for sealing the bottom end of the receptacle, the means comprising a door, and means co-acting with the top wall for securing the door in a closed position relative to the receptacle.

2. A device of the class described, comprising a receptacle having a perforated side wall and a top wall, and means for sealing the bottom end of the receptacle, the means comprising a door, and a spring member co-acting with the top wall for securing the door in a closed position relative to the receptacle.

3. A device of the class described comprising a receptacle having a perforated side wall, and a top wall, and means for sealing the bottom end of the receptacle, the means comprising a plurality of doors, and spring means co-acting with the top wall for securing the doors in a closed position relative to the receptacle.

4. A device of the class described comprising a receptacle having a perforated side wall, and a top wall, and means for sealing the bottom end of the receptacle, the means comprising a plurality of doors, and spring means co-acting with the top wall for securing the door in either a closed or open position relative to the receptacle.

5. A device of the class described comprising a receptacle having a side wall and a top wall, and means for sealing the bottom end of the receptacle, the means comprising a door pivotally secured to the receptacle, and means co-acting with the top wall of the receptacle for securing the door in a closed position relative to the receptacle.

6. A device of the class described comprising a receptacle having a perforated side wall, a top end wall having an aperture therein, a plurality of doors for closing the bottom end of the receptacle, and a handle for the doors comprising a plurality of joined spring members each having an end secured to one of the doors, the handle being adapted to project through the aperture in the top end wall and to engage that wall to lock the doors in a closed position.

7. A device of the class described comprising a receptacle having a perforated side wall, a top end wall and a bottom end wall consisting of a plurality of doors, and a handle for the doors comprising a plurality of joined spring members each having an end secured to one of the doors, the handle being adapted to co-act with the top wall to lock the doors in the closed position.

8. A device of the class described comprising a cylindrical receptacle having a perforated side wall, a top end wall, a door in the top end wall, a bottom end wall consisting of a plurality of doors, and a handle for the doors of the bottom end wall comprising a plurality of joined spring members each having an end secured to one of the doors of the bottom end wall, the handle being adapted to co-act with the top wall to lock the doors of the bottom wall in the closed position.

In witness whereof, I hereunto subscribe my name this 11 day of April, 1921.

EDWARD F. FRAUTNICK.

Witnesses:
MARGENE MOORE,
G. L. PAULSON.